United States Patent
Sun et al.

(10) Patent No.: US 8,503,813 B2
(45) Date of Patent: Aug. 6, 2013

(54) IMAGE RECTIFICATION METHOD

(75) Inventors: Wei-Ning Sun, Zhejiang (CN); Jin Wang, Zhejiang (CN)

(73) Assignee: ArcSoft Hangzhou Co., Ltd., Hangzhou, Zhejiang (CN)

( * ) Notice: Subject to any disclaimer, the term of this patent is extended or adjusted under 35 U.S.C. 154(b) by 303 days.

(21) Appl. No.: 12/976,435

(22) Filed: Dec. 22, 2010

(65) Prior Publication Data

US 2012/0163728 A1 Jun. 28, 2012

(51) Int. Cl.
*G06K 9/40* (2006.01)
*G06K 9/36* (2006.01)
*H04N 1/407* (2006.01)

(52) U.S. Cl.
USPC ............................ 382/260; 382/276; 358/3.27

(58) Field of Classification Search
USPC ................. 382/160, 168, 181, 199, 205, 260, 382/266, 274–276, 279, 300; 358/3.27, 516, 358/520, 525, 532; 345/606
See application file for complete search history.

(56) References Cited

U.S. PATENT DOCUMENTS

| | | | |
|---|---|---|---|
| 7,171,056 B2 * | 1/2007 | Zhang et al. | 382/276 |
| 7,780,084 B2 * | 8/2010 | Zhang et al. | 235/462.11 |
| 8,098,936 B2 * | 1/2012 | Guerzhoy et al. | 382/181 |
| 8,244,062 B2 * | 8/2012 | Dey et al. | 382/276 |

* cited by examiner

*Primary Examiner* — Kanjibhai Patel
(74) *Attorney, Agent, or Firm* — Muncy, Geissler, Olds & Lowe, PLLC (57) ABSTRACT

An image rectification method includes the steps of: detecting edges in an image by using a Canny filter; performing Hough transform on the edges to detect lines in the image; selecting a candidate quadrangle from quadrangles formed by the detected lines; obtaining a transform matrix for transforming the candidate quadrangle to a rectangle by homographic transform; rectifying the image by using the transform matrix; and enhancing the rectified image.

7 Claims, 8 Drawing Sheets

IMAGE RECTIFICATION METHOD

BACKGROUND OF THE INVENTION

1. Field of Invention

The present invention relates to an image process method, and in particular to an image rectification method.

2. Related Art

The image capturing device such as a digital camera, mobile phone with photoing function, or web cam is widely used in many applications. Users can take pictures or record data by the image capturing device.

For example, in the meeting room, people may write down some ideas or opinions on the whiteboard, or show their slides or pictures on the screen or wall through the projector. Then, the other attendants can note down the information written on the whiteboard or shown on the screen or wall. Now, people have a wiser way to note down the information that is to take photos from the whiteboard, screen or wall. These photos are stored in electronic media such as a memory card, a hard disk or an optical disk, so that they can be easily spread through the above media or e-mail. People can read or study these contents again from the photos after the meeting.

Figure 1A:
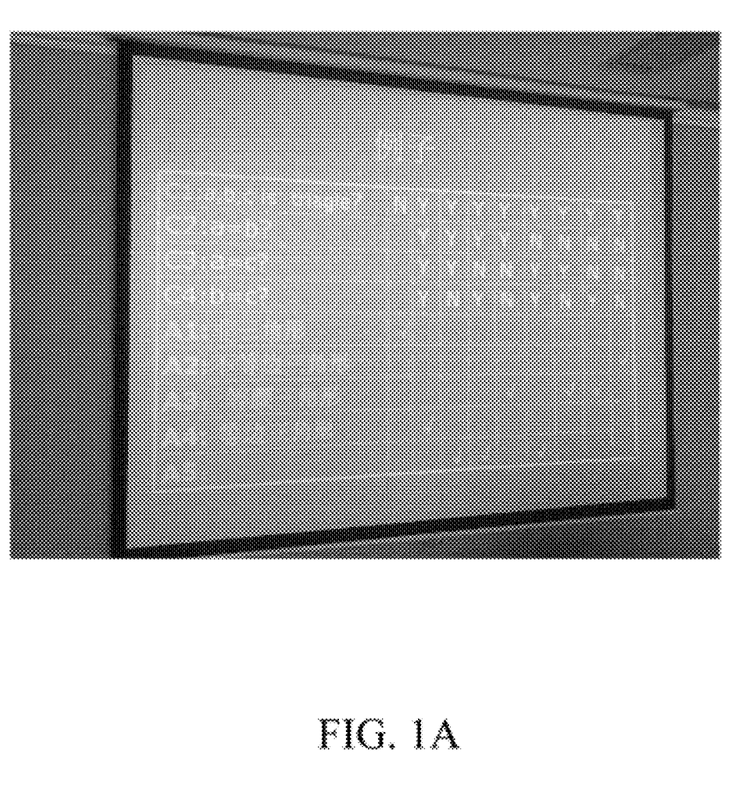
FIG. 1A to FIG. 1C are schematic diagrams showing the photos took by the conventional way that contains distorted objects.
Figure 1B:
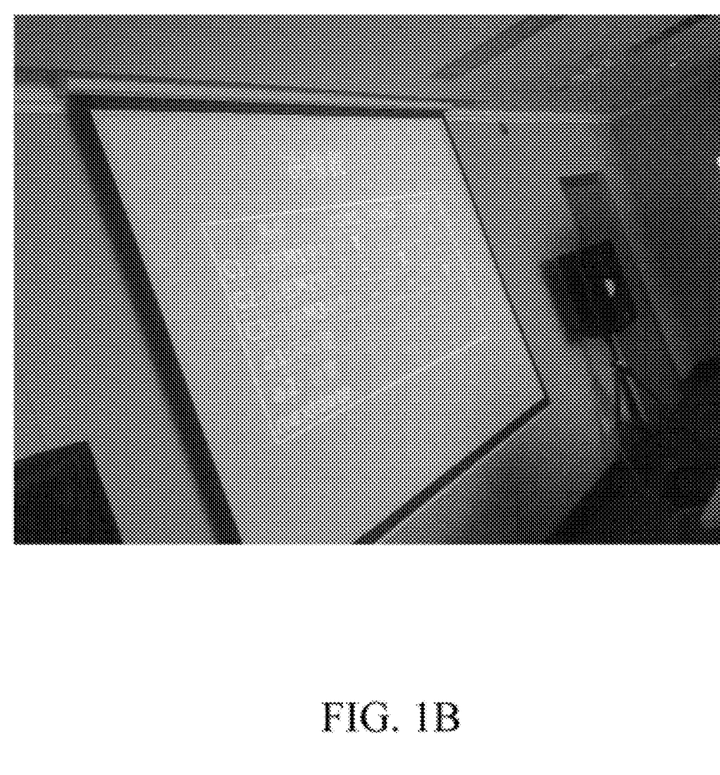
Figure 1C:
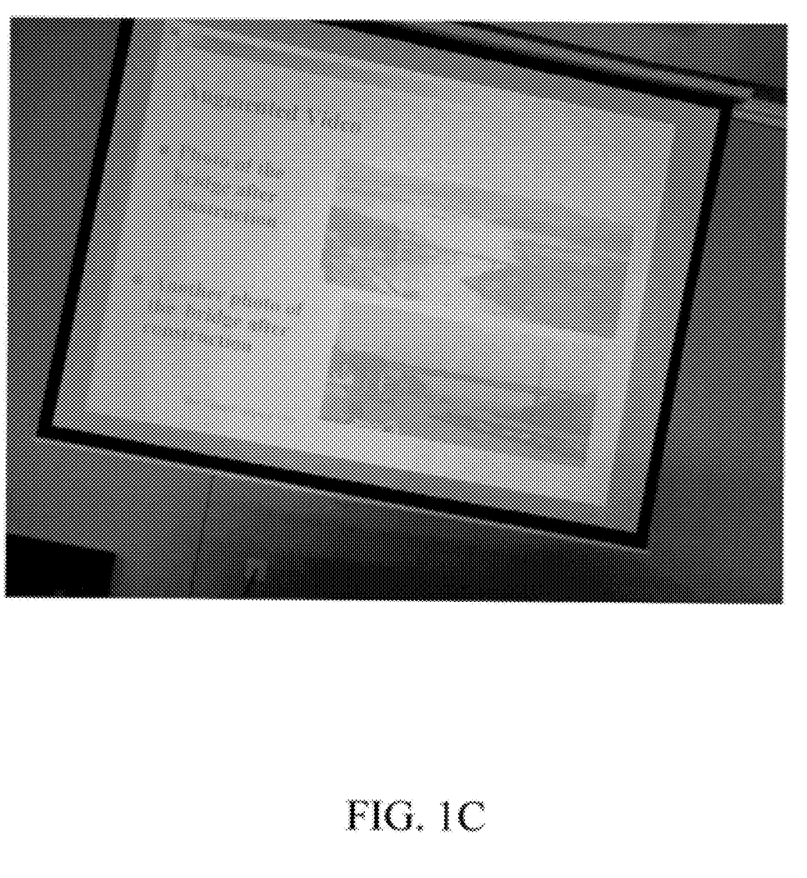

However, some image distortion may occur in these photos because of bad viewing angles, and the rectangle object such as the whiteboard or document looks like a distorted quadrangle. For example, FIG. 1A to FIG. 1C show some distorted objects in the photos. Referring to FIG. 1A, the photo is taken at a small viewing angle, and thus the captured screen region is an arbitrary quadrangle instead of a rectangle. What makes matters worse, referring to FIG. 1B, if the photo is taken at a bad viewing angle, which is far away from the normal line of the rectangle object, parts of the image far away from the image capturing device are too small to be identified. Furthermore, as shown in FIG. 1C, the photo has blurred image and some contents are not clear and can not be recognized.

Therefore, it is an important subject to provide an image rectification method which can rectify the distorted quadrangle in the image.

SUMMARY OF THE INVENTION

In view of the foregoing subject, an objective of the present invention is to provide an image rectification method which can rectify the distorted quadrangle of the image.

To achieve the above objective, the present invention discloses an image rectification method includes the steps of: detecting edges in an image by using a Canny filter; performing Hough transform on the edges to detect lines in the image; selecting a candidate quadrangle from quadrangles formed by the detected lines; obtaining a transform matrix for transforming the candidate quadrangle to a rectangle by homographic transform; rectifying the image by using the transform matrix; and enhancing the rectified image.

As mentioned above, the image rectification method according to the invention utilizes homographic transform to rectify the image, so that the quadrangle object in the photo is rectified to obtain a rectified object similar to the real one. It is therefore benefit for the user to read the contents in these photos.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
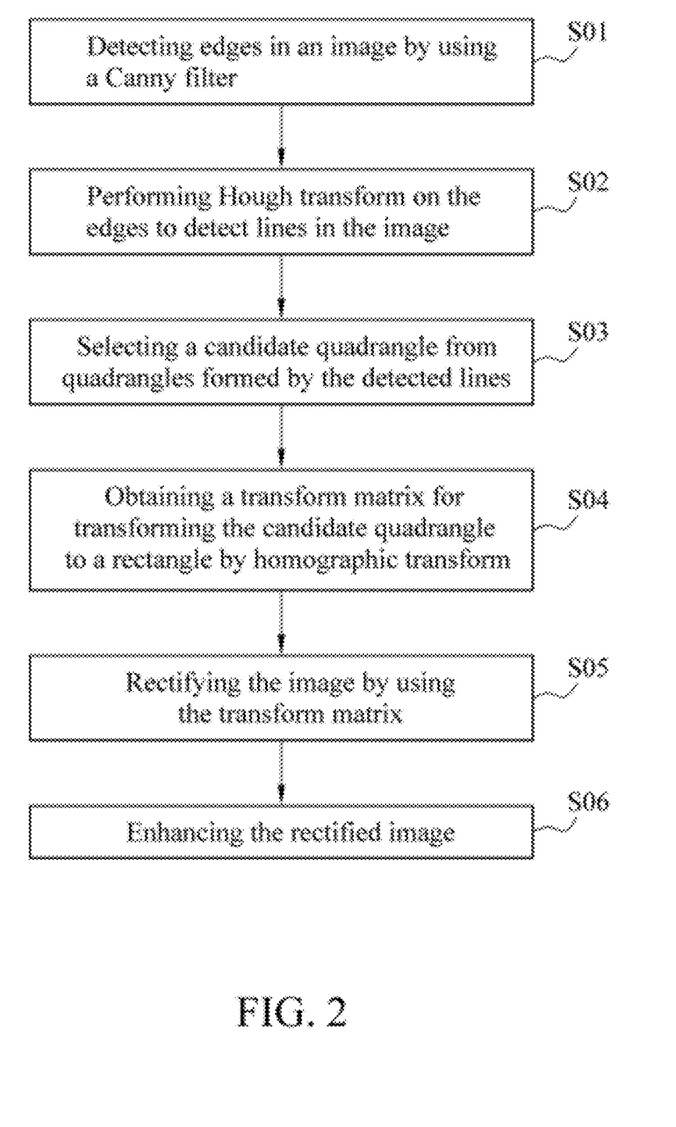
FIG. 2 and FIG. 3 are flow charts of the image rectification method according to an embodiment of the invention.

FIG. 2 is a flow chart of the image rectification method according to an embodiment of the invention. The image rectification method can be applied to the photos containing distorted quadrangle as shown in FIG. 1A to FIG. 1C.

Referring to FIG. 2, the image rectification method includes the following steps S01 to S05:

step S01: detecting edges in an image by using a Canny filter;

step S02: performing Hough transform on the edges to detect lines in the image;

step S03: selecting a candidate quadrangle from quadrangles formed by the detected lines;

step S04: obtaining a transform matrix for transforming the candidate quadrangle to a rectangle by homographic transform;

step S05: rectifying the image by using the transform matrix; and step S06: enhancing the rectified image.

In step S01, the algorithm of Canny filter is used to detect the edges in the image, and it has several advantages as follow. The most obvious advantages are the low error rate the correct detection with respect to the edges in the images. Another advantage is that the points on the edge of the image can be well localized. An additional advantage is to have only one response to a single edge, and it can avoid to incorrectly detect a single edge as two or more edges.

In step S02, the Hough transform used to detect lines in the image is a feature extraction technique used in image process, and it is performed to detect straight lines in the image.

In step S03, a method of exhaustion is performed to form all possible quadrangles. Because the true rectangle has four corners, and the captured photo may contain a rectangle lack of one or more corners, the step S03 selects a candidate quadrangle which contains the most corners.

In addition, step S03 may be performed with a filter condition. The filter condition is, for example, based on the pixel quantity contained in a quadrangle.

Figure 3:
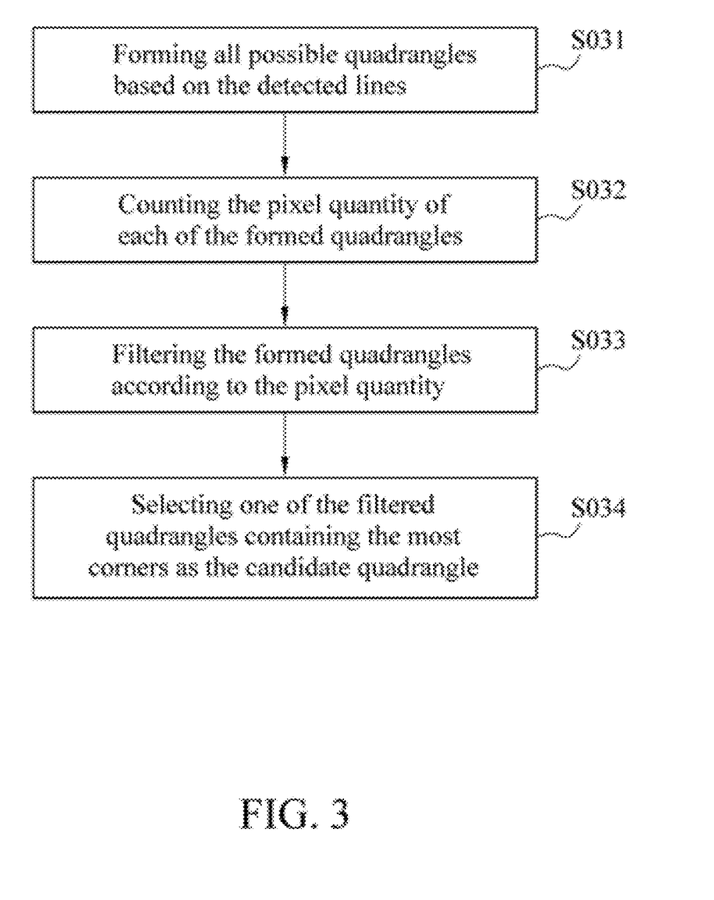

For example, FIG. 3 shows a detail procedure of step S03. Referring to FIG. 3, the step S03 includes steps S031 to S034 as follow:

S031: forming all possible quadrangles based on the detected lines, for example, by using the method of exhaustion;

S032: counting the pixel quantity of each of the formed quadrangles;

S033: filtering the formed quadrangles according to the pixel quantity; and

S034: selecting one of the filtered quadrangles containing the most corners as the candidate quadrangle.

The step S033 finds out a quadrangle containing the most pixels from the formed quadrangles, and sets a maximum pixel quantity value according to the pixel quantity of the found quadrangle. Then the pixel quantity of the filtered quadrangles fulfils the following formula:

$$n\text{Valid} > n\text{MaxValid} \times R$$

wherein nValid represents the pixel quantity of the filtered quadrangles, nMaxValid represents the maximum pixel quantity value, and R represents a ratio which may be 0.6 for example. Since the amount of formed quadrangles may be very large due to the method of exhaustion in step S031, this may cause low processing efficiency. Therefore, the step S033 is performed to filter out some unnecessary quadrangles from the formed quadrangles so as to narrow down the total amount of quadrangles for next step.

In the step S034, because the captured photo may contain a rectangle lack of one or more corners, the step S034 selects a candidate quadrangle which contains the most corners.

Furthermore, referring back to FIG. 2, a transform matrix is obtained for transforming the candidate quadrangle to a rectangle by homographic transform. The step S04 sets vertex positions of the rectangle, and then obtains the transform matrix by homographic transform according to the vertex positions of the candidate quadrangle and the vertex positions of the rectangle.

In the embodiment, the transform matrix is obtained by the formula:

$$\lambda = (A^T A)^{-1} A^T B$$

wherein λ is a transform matrix, A is $$\begin{pmatrix} x_1 & y_1 & 1 & 0 & 0 & 0 & -X_1 x_1 & -X_1 y_1 \\ 0 & 0 & 0 & x_1 & y_1 & 1 & -Y_1 x_1 & -Y_1 y_1 \\ x_2 & y_2 & 1 & 0 & 0 & 0 & -X_2 x_2 & -X_2 y_2 \\ 0 & 0 & 0 & x_2 & y_2 & 1 & -Y_2 x_2 & -Y_2 y_2 \\ \vdots & \vdots & \vdots & \vdots & \vdots & \vdots & \vdots & \vdots \\ x_n & y_n & 1 & 0 & 0 & 0 & -X_n x_n & -X_n y_n \\ 0 & 0 & 0 & x_n & y_n & 1 & -Y_n x_n & -Y_n y_n \end{pmatrix},$$

B is $$\begin{pmatrix} X_1 \\ Y_1 \\ X_2 \\ Y_2 \\ \vdots \\ X_n \\ Y_n \end{pmatrix},$$

n is 1-4, $(x_n, y_n)$ represents the vertex positions of the candidate quadrangle, and $(X_n, Y_n)$ represents the vertex positions of the rectifying rectangle.

After obtaining the transform matrix, the image is rectified by using the transform matrix. This transform is a position transform, and the pixel positions of the rectified image is obtain after performing transform matrix on the pixel positions of the original image. The pixel values of the rectified image are set according to the corresponding pixel of the original image. In addition, the transform matrix also has the function of scaling the image, and thus the distorted contents in the image may be modified to obtain a new image similar to the real picture. After performing the matrix transform, the step S05 performs bilinear interpolation to obtain extra pixels in the rectified image so that each pixel in the rectified image has a corresponding pixel value.

The step S06 enhances the rectified image, this step builds a luminance histogram of the image, which has a low region, a middle region, and a high region. The step S06 then linearly extends the range of the middle region, and the percentage of the low region in the image and the percentage of the high region in the image are larger than a threshold value. In this embodiment, the threshold value is, for example, about 10%.

For example, the range of the low region is from 0 to the lower limit of the middle region, and the range of the high region is from the upper limit of the middle region to 255. The pixel quantities in the low region and high region fulfill the following formula:

$$S_{low} > n\text{SizeImage} \times T$$

$$S_{high} > n\text{SizeImage} \times T$$

wherein $S_{low}$ is the pixel quantity in the low region, $S_{high}$ is the pixel quantity in the high region, nSizeImage is the size of the image, and T is the threshold value. In addition, the step S06 performs gamma transform on the rectified image to improve image quality. The expression of the gamma transform can be the following formula:

$$V_{out} = V_{in}^{\gamma}$$

wherein $V_{in}$ is the pixel value of the rectified image before gamma transform, $V_{out}$ is the pixel value of the rectified image after gamma transform, and γ is set to 2.5 for example.

The gamma transform may be applied to the rectified image applied with linearly extending the range of the middle region, or it may be performed on the rectified image before extending the range of the middle region. After the step S06, the contrast of the rectified image can be improved.

In the embodiment, the above method can be realized by a computing device. The computing includes a memory for storing program codes and data, and a processor for executing the program codes to process the data. The procedure of the above method can be implemented as the program codes and data. The image can originate from an image capturing device such as a digital camera, mobile phone with photoing function, web cam, etc.

Figure 4A:
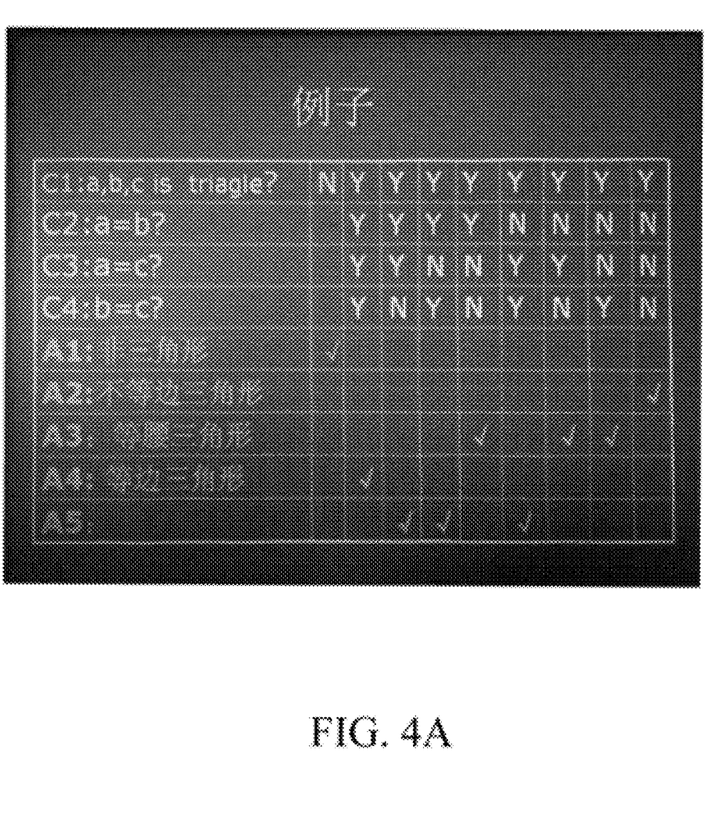
FIG. 4A to FIG. 4C are schematic diagrams showing the rectified photos by using the image rectification method according to the embodiment of the invention.
Figure 4B:
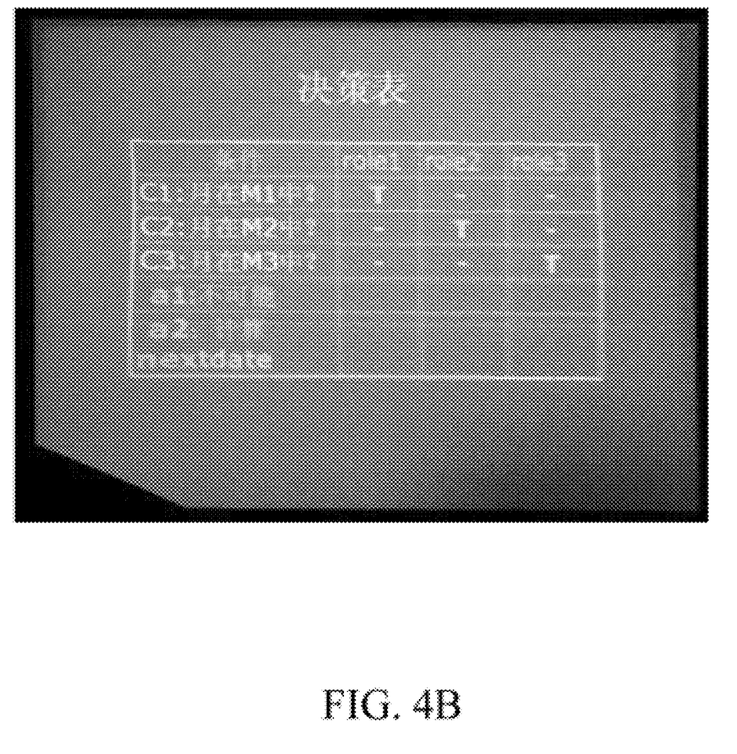
Figure 4C:
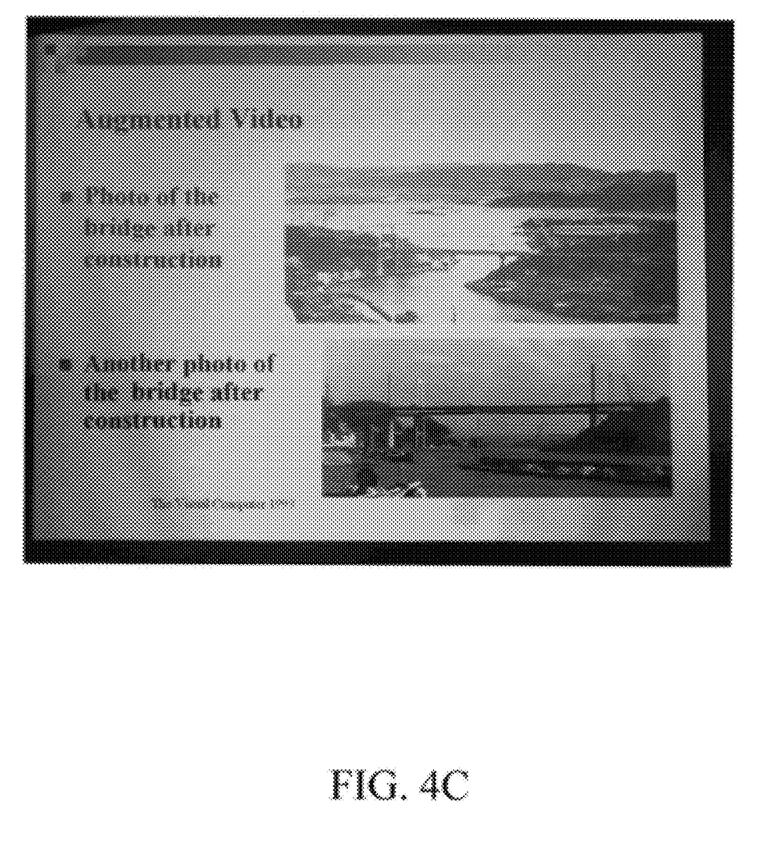

FIG. 4A to FIG. 4C are schematic diagrams showing the photos processed by the above method. FIG. 4A shows the photo of FIG. 1A is processed by the above method so that the distorted quadrangle is modified to the rectangle and the contents in the photo are corresponding scaled. FIG. 4B shows the photo of FIG. 1B, which is processed by the above method, so that the distorted quadrangle lack of a corner is modified to a shape similar to rectangle and the contents in the photo are easy to read after being correspondingly scaled. FIG. 4C shows the photo of FIG. 1C, which is processed with the rectification method, so that the blurring portion of the photo is also modified to be clear and easy to recognize.

In summary, the image rectification method according to the invention utilizes homographic transform to rectify the image, so that the distorted quadrangle object in the photo is rectified to obtain a rectified object similar to the real one. It is therefore benefit for the user to read the contents in these photos.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image rectification method comprising:
 detecting edges in an image by using a Canny filter;
 performing Hough transform on the edges to detect lines in the image;
 selecting a candidate quadrangle from quadrangles formed by the detected lines;
 obtaining a transform matrix for transforming the candidate quadrangle to a rectangle by homographic transform;
 rectifying the image by using the transform matrix; and
 enhancing the rectified image,
 wherein the step of enhancing the rectified image comprises:
 building a luminance histogram of the image, wherein the luminance histogram has a low region, a middle region, and a high region; and
 extending the range of the middle region, wherein the percentage of the low region in the image and the percentage of the high region in the image are larger than a threshold value.

2. The image rectification method according to claim 1, wherein the step of obtaining the transform matrix comprises:
 setting vertex positions of the rectangle; and
 obtaining the transform matrix by homographic transform according to the vertex positions of the candidate quadrangle and the vertex positions of the rectangle.

3. The image rectification method according to claim 2, wherein the transform matrix is obtained by the formula: $\lambda=(A^T A)^{-1} A^T B$, wherein $\lambda$ is a transform matrix,
 A is $$\begin{pmatrix} x_1 & y_1 & 1 & 0 & 0 & 0 & -X_1 x_1 & -X_1 y_1 \\ 0 & 0 & 0 & x_1 & y_1 & 1 & -Y_1 x_1 & -Y_1 y_1 \\ x_2 & y_2 & 1 & 0 & 0 & 0 & -X_2 x_2 & -X_2 y_2 \\ 0 & 0 & 0 & x_2 & y_2 & 1 & -Y_2 x_2 & -Y_2 y_2 \\ \vdots & \vdots & \vdots & \vdots & \vdots & \vdots & \vdots & \vdots \\ x_n & y_n & 1 & 0 & 0 & 0 & -X_n x_n & -X_n y_n \\ 0 & 0 & 0 & x_n & y_n & 1 & -Y_n x_n & -Y_n y_n \end{pmatrix},$$

B is $$\begin{pmatrix} X_1 \\ Y_1 \\ X_2 \\ Y_2 \\ \vdots \\ X_n \\ Y_n \end{pmatrix},$$

n is 1-4, $(x_n, y_n)$ represents the vertex positions of the candidate quadrangle, and $(X_n, Y_n)$ represents the vertex positions of the rectifying rectangle.

4. The image rectification method according to claim 1, further comprising a step of:
 performing bilinear interpolation to obtain extra pixels in the rectified image.

5. The image rectification method according to claim 1, wherein the threshold value is 10%.

6. The image rectification method according to claim 1, wherein the step of enhancing the rectified image further comprises:
 performing gamma transform on the rectified image.

7. The image rectification method according to claim 1, wherein the step of selecting the candidate quadrangle comprises:
 forming all possible quadrangles based on the detected lines;
 counting the pixel quantity of each of the formed quadrangles;
 filtering the formed quadrangles according to the pixel quantity; and
 selecting one of the filtered quadrangles containing the most corners as the candidate quadrangle.

* * * * *